(12) United States Patent
Ceccato

(10) Patent No.: US 12,085,488 B2
(45) Date of Patent: Sep. 10, 2024

(54) DEVICES AND METHODS FOR USE WITH CHEMICAL VAPOUR SAMPLING MATERIAL

(71) Applicant: The Commonwealth of Australia, Edinburgh (AU)

(72) Inventor: Claudio Ceccato, Edinburgh (AU)

(73) Assignee: The Commonwealth of Australia (AU)

( * ) Notice: Subject to any disclaimer, the term of this patent is extended or adjusted under 35 U.S.C. 154(b) by 305 days.

(21) Appl. No.: 17/761,915

(22) PCT Filed: Sep. 18, 2020

(86) PCT No.: PCT/AU2020/050989
§ 371 (c)(1),
(2) Date: Mar. 18, 2022

(87) PCT Pub. No.: WO2021/051166
PCT Pub. Date: Mar. 25, 2021

(65) Prior Publication Data
US 2022/0326123 A1    Oct. 13, 2022

(30) Foreign Application Priority Data
Sep. 19, 2019   (AU) ................................. 2019903490

(51) Int. Cl.
*G01N 1/22*     (2006.01)
*G01N 1/02*     (2006.01)

(52) U.S. Cl.
CPC ..... *G01N 1/2273* (2013.01); *G01N 2001/028* (2013.01)

(58) Field of Classification Search
CPC ............... G01N 1/2273; G01N 1/2214; G01N 2001/2291; G01N 2030/009; G01N 2001/028
See application file for complete search history.

(56) References Cited

U.S. PATENT DOCUMENTS

2002/0150513 A1* 10/2002 Nunes ...................... B01L 1/52
422/400
2005/0011831 A1    1/2005 Pawliszyn
(Continued)

FOREIGN PATENT DOCUMENTS

CN       206281691      6/2017
WO       2017194926     11/2017

OTHER PUBLICATIONS

International Searching Authority, "International Search Report," issued in connection with International Application No. PCT/AU2020/050989, mailed on Oct. 9, 2020, 6 pages.
(Continued)

*Primary Examiner* — Paul M. West
(74) *Attorney, Agent, or Firm* — Hanley, Flight & Zimmerman, LLC

(57) ABSTRACT

Embodiments generally relate to a device for housing chemical vapour sampling material. The device comprises a housing comprising a barrel, the barrel being configured to hold at least one fibre of chemical vapour sampling material, the barrel having a first opening at a first end configured to deploy at least a portion of the at least one fibre of chemical vapour sampling material; an extension mechanism arranged to cause extension and retraction of the at least one fibre of chemical vapour sampling material from the housing via the first opening; the extension mechanism being operable by actuation of at least one actuator. Actuating the at least one actuator causes extension or retraction of the at least one fibre of the chemical vapour sampling material from the housing via the first opening.

20 Claims, 7 Drawing Sheets

(56) References Cited

U.S. PATENT DOCUMENTS

| | | |
|---|---|---|
| 2006/0123931 A1 | 6/2006 | Wareham et al. |
| 2006/0241515 A1 | 10/2006 | Jones et al. |
| 2009/0199621 A1 | 8/2009 | Land, III |
| 2010/0011888 A1* | 1/2010 | Pawliszyn .......... A61B 5/15003 73/864.11 |
| 2014/0030818 A1 | 1/2014 | Schueler et al. |
| 2014/0366651 A1 | 12/2014 | Harvey et al. |

OTHER PUBLICATIONS

International Searching Authority, "Written Opinion," issued in connection with International Application No. PCT/AU2020/050989, mailed on Oct. 9, 2020, 4 pages.

International Preliminary Examining Authority, "Written Opinion," issued in connection with International Application No. PCT/AU2020/050989, mailed on Aug. 4, 2021, 4 pages.

International Preliminary Examining Authority. "International Preliminary Report on Patentability," issued in connection with International Application No. PCT/AU2020/050989, mailed on Nov. 2, 2021, 15 pages.

* cited by examiner

DEVICES AND METHODS FOR USE WITH CHEMICAL VAPOUR SAMPLING MATERIAL

RELATED APPLICATIONS

This patent arises from a U.S. national stage of International Patent Application No. PCT/AU2020/050989, which was filed on Sep. 18, 2020, under the Patent Cooperation Treaty (PCT) and claims priority to Australian Patent Application Ser. No. 20/19903490, which was filed on Sep. 19, 2019. Priority to International Patent Application No. PCT/AU2020/050989 and Australian Patent Application Ser. No. 20/19903490 are claimed.

TECHNICAL FIELD

Embodiments generally relate to devices and methods for chemical vapour sampling. In particular, embodiments relate to housing devices and methods for use with chemical vapour sampling material.

BACKGROUND

Detection of chemical vapours, such as toxic industrial chemical vapours and chemical warfare agent vapours, can be beneficial for the health and safety of factory workers at industrial sites as well as for emergency services and military personnel. Detection of these vapours can be used to alert people so that they can clear a hazardous area, and/or seek appropriate medical attention where there has been a dangerous level of exposure.

It is desired to address or ameliorate one or more shortcomings or disadvantages associated with prior methods, systems, devices and applications for use in relation to the detection of chemical vapours, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a device for housing chemical vapour sampling material, the device comprising: a housing comprising a barrel, the barrel being configured to hold at least one fibre of chemical vapour sampling material, the barrel having a first opening at a first end configured to deploy at least a portion of the at least one fibre of chemical vapour sampling material; an extension mechanism arranged to cause extension and retraction of the at least one fibre of chemical vapour sampling material from the housing via the first opening; the extension mechanism being operable by actuation of at least one actuator, wherein actuating the at least one actuator causes extension or retraction of the at least one fibre of the chemical vapour sampling material from the housing via the first opening.

The extension mechanism may comprise a retractable extension mechanism engaged with a second end of the barrel, and the at least one actuator comprises a button.

The barrel may be configured to hold at least three fibres of chemical vapour sampling material.

The extension mechanism may be arranged to cause extension and retraction of the at least one fibre, or at least three fibres, of chemical vapour sampling material simultaneously.

The at least one actuator may comprise a first button and second button, the actuation of the first button causing extension of the at least one fibre, or at least three fibres, of chemical vapour sampling material from the housing via the first opening, and the second button causing retraction of the at least one fibre, or at least three fibres, of chemical vapour sampling material from the housing via the first opening.

The at least one actuator may comprise a single button, wherein the actuation of the single button causes alternate extension and retraction of the at least one fibre of the chemical vapour sampling material from the housing via the first opening.

The device may further comprise a front housing, having a first and second end, the second end of the front housing fixable to the first end of the barrel and arranged to house the sampling ends of loaded fibres of chemical vapour sampling material.

The device may further comprise an end cap fixable to the first end of the front housing.

The device may further comprise a rear housing, fixable to the second end of the barrel, and arranged to house the sampling end of the at least one fibre of chemical vapour sampling material.

The device may further comprise at least one internal fixing ring for the at least one fibre of chemical vapour sampling material, arranged to align the at least one fibre within the interior of the housing.

The device may further comprise at least one sealing ring between the barrel and the rear housing.

The device may further comprise at least one sealing ring between the front housing the end cap.

The device may further comprise a spring housed within the barrel and connected to the at least one internal fixing ring at a first end, and the interior of the housing at a second end, arranged to provide a retracting force upon compression by the extension mechanism.

The extension mechanism may comprise a plunger, having a first end and second end, wherein the first end is disposed against the at least one internal fixing ring, and the second end may be accessible by a user.

The extension mechanism may further comprise at least one aperture, providing user access to the second end of the plunger, allowing use of the plunger as a button to extend the extension mechanism.

The extension mechanism may further comprise a locking spring fixable to the plunger and accessible by a user, tensioned against the at least one aperture, allowing displacement of the plunger when the second end of the plunger is pressed, and return of the plunger when the locking spring is depressed.

The housing may be environmentally sealed.

Some embodiments relate to a method of taking chemical vapour sample comprising the steps of: Loading at least one fibre of a chemical vapour sampling material into a housing, the housing comprising a barrel having a first and second end; Causing an extension of the at least one chemical vapour sampling material from a first end of the housing by actuation of an extension mechanism, the retractable extension mechanism attached to a second end of the housing; Retracting the at least one chemical vapour sampling material back into the housing, by actuation of the retractable extension mechanism, and environmentally sealing the housing.

The housing may be configured to hold at least one fibre of chemical vapour sampling material. In a particular form, the housing may be configured to hold at least three fibres of chemical vapour sampling material.

The actuation of the extension mechanism may be operable by a single hand.

The housing may be environmentally sealed by affixing an end cap to a first end of the barrel.

The method may further comprise the step of sterilising the exterior of the housing.

DESCRIPTION OF EMBODIMENTS

Embodiments generally relate to devices and methods for chemical vapour sampling. In particular, embodiments relate to housing devices and methods for use with chemical vapour sampling material.

Figure 1:
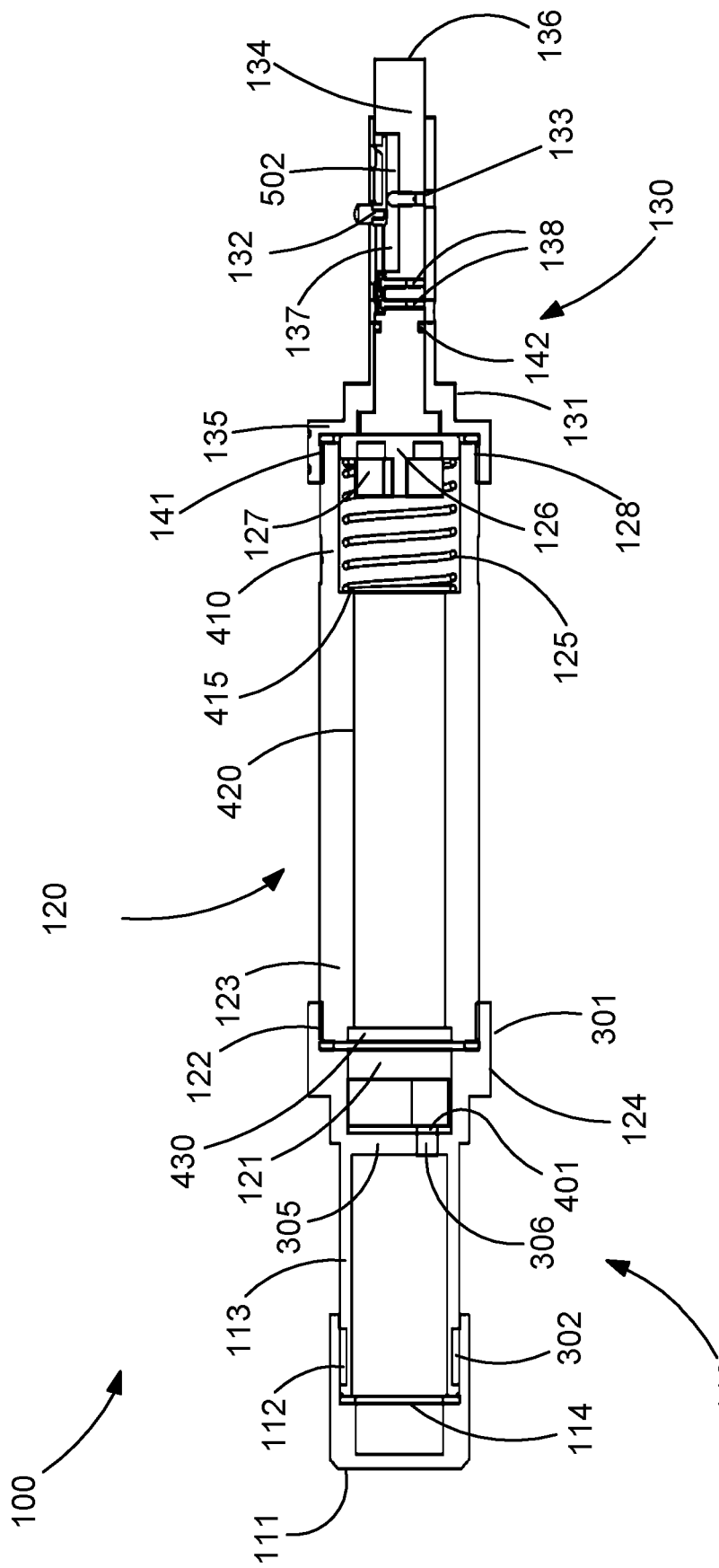
FIG. 1 is a sectional view of a chemical vapour sampler housing device according to some embodiments.

FIG. 1 depicts a chemical vapour sampler housing device 100. Housing device 100 may be configured to house one or more chemical vapour sampler materials. For example, housing device 100 may be configured to house one or more chemical vapour sampling fibres, which may be Solid Phase Micro Extraction (SPME) in some embodiments.

Housing device 100 has a sampling end assembly 110, barrel assembly 120, and retractable extension assembly 130. The assemblies 110, 120, and 130 may be engaged with each other to form a contiguous unit with means for separating and connecting each assembly. In some embodiments, these engagements may comprise threaded portions 122 and 128. Threaded portion 122 may comprise compatible threaded sections on sampling end assembly 110 and barrel assembly 120, to allow sampling end assembly 110 to be removably coupled with barrel assembly 120. Threaded portion 128 may comprise compatible threaded sections on barrel assembly 120 and retractable extension assembly 130, to allow barrel assembly 120 to be removably coupled with retractable extension assembly 130.

According to some embodiments, the engagements may further comprise environmental seals between assemblies 110, 120, and 130. The seals may comprise sealing rings, and may be soft washer seals in some embodiments. In some embodiments, the seals may be rubber rings. For example, housing device 100 includes a seal 114 between end cap 111 of the sampling end assembly 110 and sampler fibre guard 113, a seal 401 between the sampler fibre guard 113 and the SPME holders 601 together with seal 124 between sampling end assembly 110 and barrel assembly 120, and seal 135 between barrel assembly 120 and retractable extension assembly 130, seal 142 within retractable extension assembly 130 between plunger 134 and assembly housing 131 Seals 114, 401, 124, 135 and 142 may ensure that any water, contaminants, or decontamination/cleaning fluids do not enter the internal cavities of housing device 100. In some embodiments, the seals 114, 401, 124, 135 and 142 may be separable from assemblies 110, 120 and 130, allowing ease of replacement of seals 114, 401, 124, 135 and 142 in case of wear and tear. In other embodiments, the seals 114, 401, 124, 135 and 142 may be fixed within assembly 110, 120 or 130.

Sampling end assembly 110 includes an end cap 111, which is removable to allow access to the interior of housing device 100. In use, end cap 111 may be removed to allow any sampler fibres housed within housing device 100 to be exposed to the environment to be sampled, seal 401 between the sampler fibre guard 113 and SPME holders 601 restricts the ingress of environmental contaminants into the housing device 120. End cap 111 may be threaded to allow for end cap 111 to be screwed on and off sampling end assembly 110. According to some embodiments, sampling end assembly 110 may further comprise a seal 114 to environmentally seal the interior of sampling end assembly 110 when end cap 111 is in place.

In an assembled form with end cap 111 in place, housing device 100 may provide an environmentally sealed, watertight interior to prevent contamination of any chemical vapour into housing device 100, both before samples have been collected and once samples have been taken. Furthermore, the environmentally sealed interior of housing device 100 allows for sterilisation and wet decontamination/cleaning of the exterior of housing device 100 without impacting the chemical vapour sampler fibres stored within the housing device 100.

The housing device 100 may be assembled and disassembled for access to the sampler fibres housed within. As described above, with the end cap 111 in place, the unit is able to undergo wet decontamination/cleaning. With end cap 111 removed, the unit may be operated to collect chemical vapour samples from the environment, by exposing any sampler fibres housed within housing device 100 to the environment. The operation of exposing any sampler fibres housed within housing device 100 to the environment is performed by actuation of the retractable extension mechanism 130. Actuation of retractable extension mechanism 130 causes extension of the sampler fibres from the end of the housing device 100 to take vapour samples from an environment. According to some embodiments, actuation of retractable extension mechanism 130 may be performed using only one hand once the end cap is removed.

Figure 2:
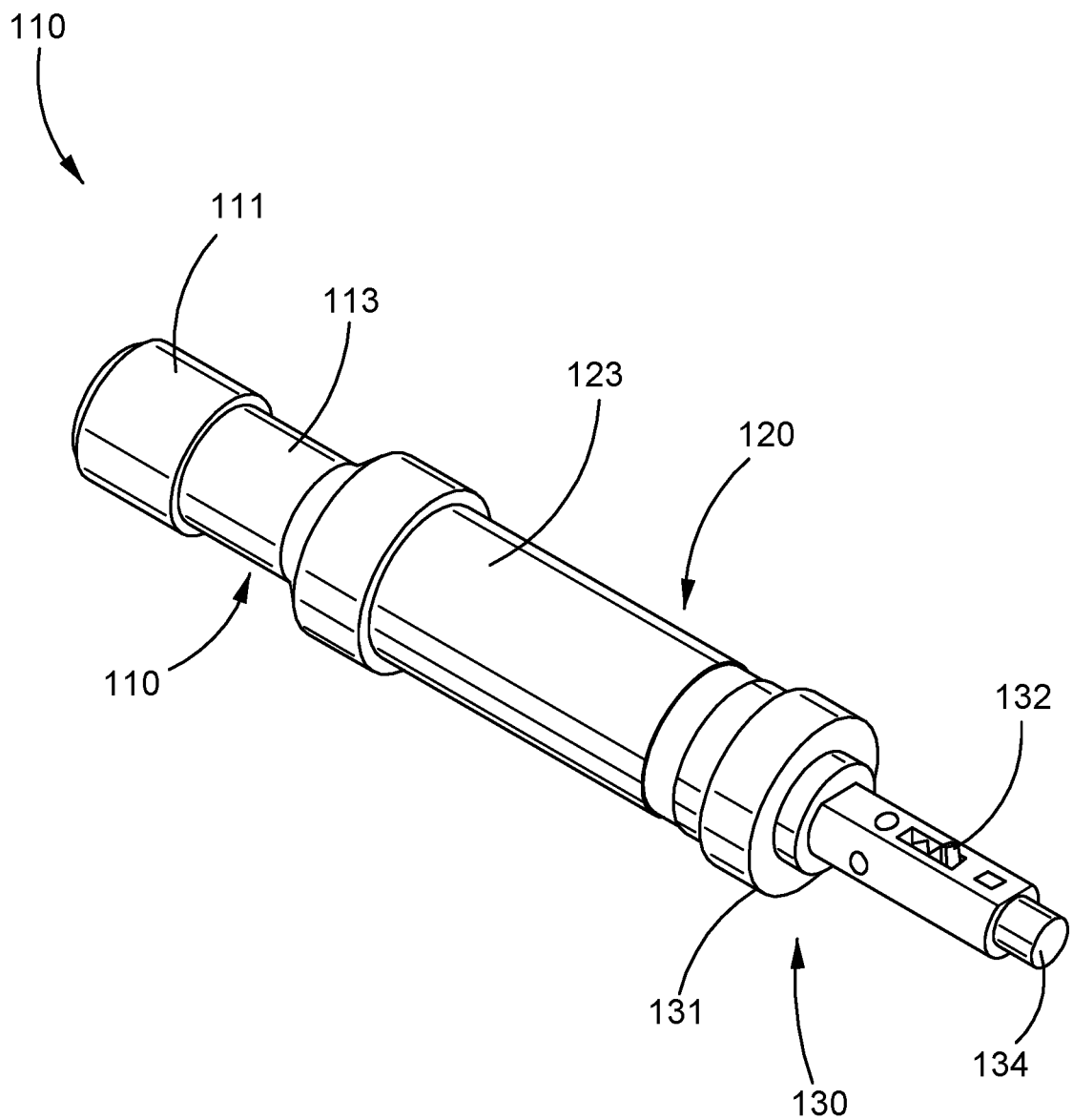
FIG. 2 is a perspective view of the chemical vapour sampler housing device of FIG. 1.

FIG. 2 depicts the housing device 100 in an assembled configuration. In this embodiment, the housing device 100 comprises an environmentally sealed unit, having end cap 111 in place. In such an embodiment, the unit is capable of being sterilised or decontaminated without impacting any sampler fibres stored within the housing device 100. Such processes may involve exposing housing device 100 to sterilisation fluids, which may be blocked from entering the interior of housing device 100 by the end cap 111 and seal 114 at the sampling end, in addition to the threaded engagements 122 and 128 with sealing rings 124 and 135 between the sampling end assembly 110, barrel assembly 120, and the retractable extension assembly 130, and with seal 142 between plunger 134 and assembly housing 131 allowing the retractable extension assembly 130 to actuate.

The ability of the housing device 100 to be assembly and disassembled into assemblies 110, 120, and 130 may improve portability by reducing storage size of the housing device 100 when taken to a sampling location.

In some embodiments, the sampling end assembly 110 and the barrel assembly 120 may comprise a single contiguous unit. In other embodiments, the barrel assembly 120 and the retractable extension assembly 130 may comprise a single contiguous unit. In such embodiments, the combination of the two assemblies may minimize complexity and time required to assemble or disassemble the device, in addition to improving durability, and reduction in potential access points for contaminants through threaded connections.

Figure 3A:
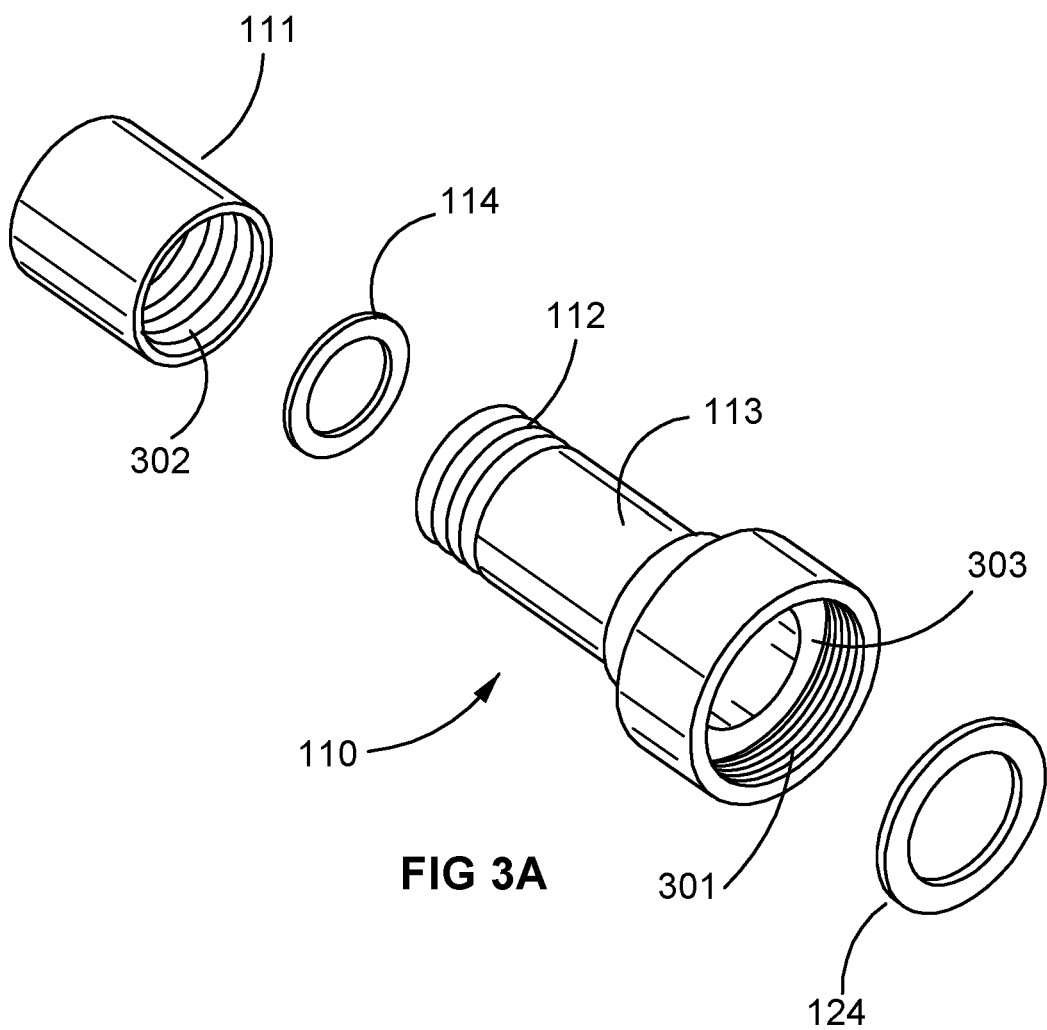
FIG. 3A is an exploded perspective view of a first portion of the chemical vapour sampler housing device of FIG. 1.

FIG. 3A depicts an exploded view of the components of the sampling end assembly 110. The sampling end assembly 110 comprising an end cap 111 and a sampler fibre guard 113, for shielding the lengths of sampler fibres housed within housing device 100 when the fibres are extended out from sampling end assembly 110, in order to protect them from environmental damage or contamination by contact. As described above, end cap 111 may be threaded to allow for end cap 111 to be screwed on and off sampling end assembly 110. In particular, end cap 111 is provided with thread portion 302, while sampler fibre guard 113 is provided with mating thread portion 112, allowing end cap 111 to be screwed on and off sampler fibre guard 113.

End cap 111 may further be provided with seal 114 to seal the connection between end cap 111 and sampler fibre guard 113. Seal 114 may comprise a sealing ring, and may be a soft washer seal in some embodiments. In some embodiments, seal 114 may be a rubber ring. Seals 114 may ensure that any water, contaminants, or decontamination/cleaning fluids that would otherwise penetrate through the threaded portions 302 and 112 do not enter the internal cavities of housing device 100. In some embodiments, the seal 114 may be separable from end cap 111, allowing ease of replacement of seal 114 in case of wear and tear. In other embodiments, seals 114 may be fixed within end cap 114.

Figure 4A:
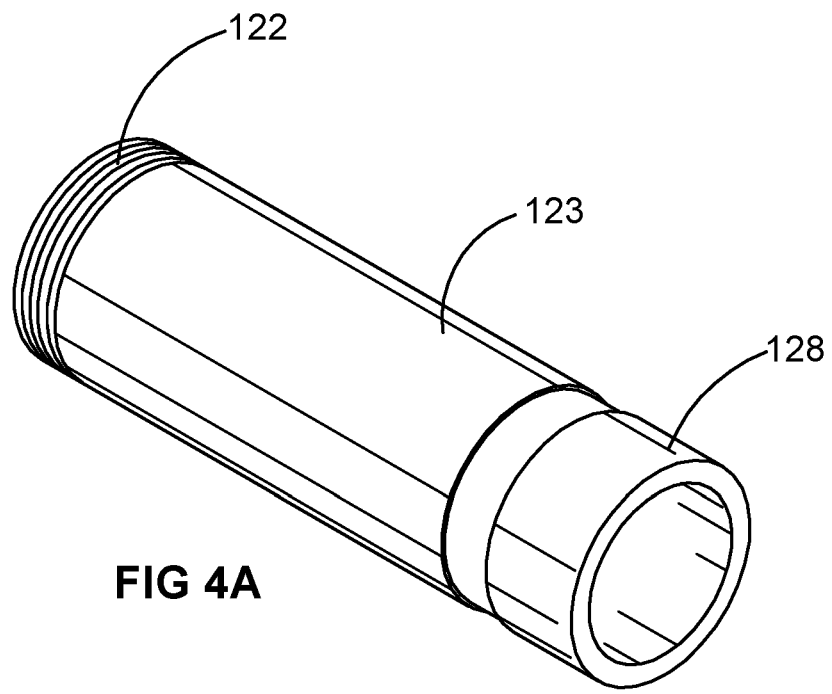
FIG. 4A is a perspective view of a housing portion of the chemical vapour sampler housing device of FIG. 1.

The sampling end assembly 110 may be releasably couplable with barrel assembly 120 through the thread portion 301 of sampling end assembly 110 engaging with thread portion 122 of barrel assembly 120, as shown in FIG. 4A. Sampling end assembly 110 may further be provided with seal 124, allowing a watertight seal to be formed between sampling end assembly 110 and barrel assembly 120. Seal 124 may be configured to lie against an internal flange 301 of sampler fibre guard 113 when sampling end assembly 110 and barrel assembly 120 are coupled.

Figure 3B:
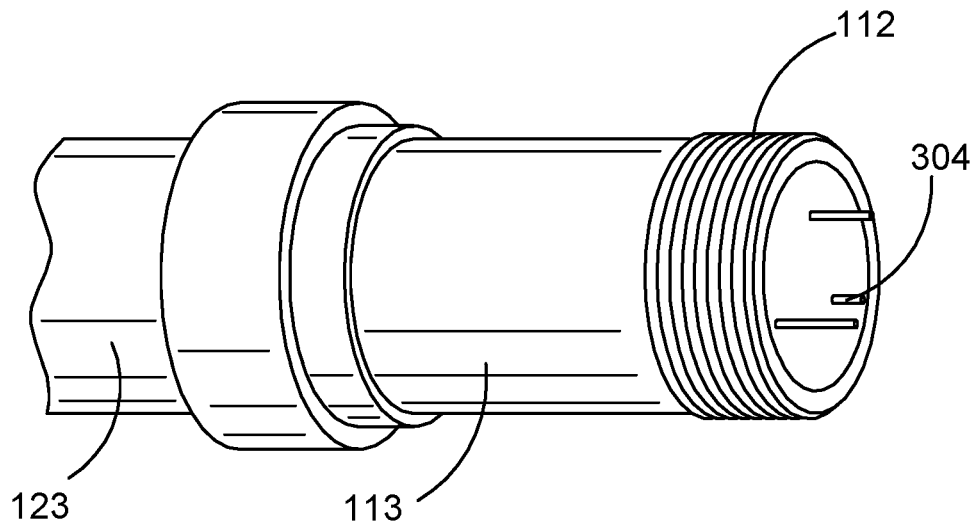
FIG. 3B is a perspective view of a front end of the chemical vapour sampler housing device of FIG. 1 showing sampling fibres deployed.

FIG. 3B depicts a perspective view of sampling end assembly 110 when chemical vapour sampler fibres are housed within housing device 100, and when the fibres are deployed from sampling end assembly 110 of the housing device 100 with end cap 111 removed. In the illustrated embodiment, three SPME fibres 304 are housed within housing device 100 and extended through the exposed end of the sampler fibre guard 113. In other embodiments, housing device 100 may house fewer fibres, such as one or two fibres. In some embodiments, a greater number of fibres may be housed within housing device 100, such as four, five, six, seven, or more fibres. In the illustrated embodiments, SPME fibres 304 are Supelco, Inc. SPME fibres in Supelco, Inc. However, any suitable sampler fibres may be used with the SPME holders 601, of the type that are designed for use with CTC CombiPAL Sigma-Aldrich product No. 57347-U. However, any suitable SPME holders may be used. In some embodiments, two or more, for instance three, of the same type of SPME holders having the same type of SPME fibres are used for replication of samples for increased sampling reliability. In other embodiments, different fibres may be used to sample a broader range of chemicals simultaneously.

An advantage associated with the configuration of the housing device 100 is the ability to hold and deploy SPME fibres from within the holders, without removing the SPME fibres. This allows for faster loader and unloading of the housing device 100, without risk of damaging or contamination of the SPME fibres.

Figure 3C:
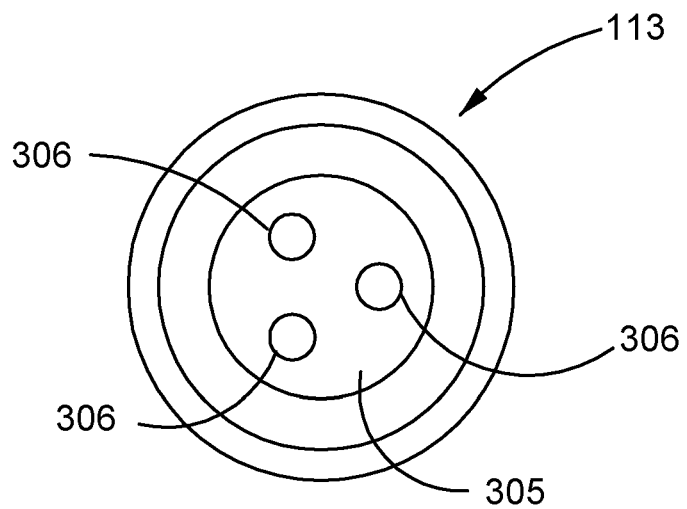
FIG. 3C is an end view of a first portion of the chemical vapour sampler housing device of FIG. 1.
Figure 3D:
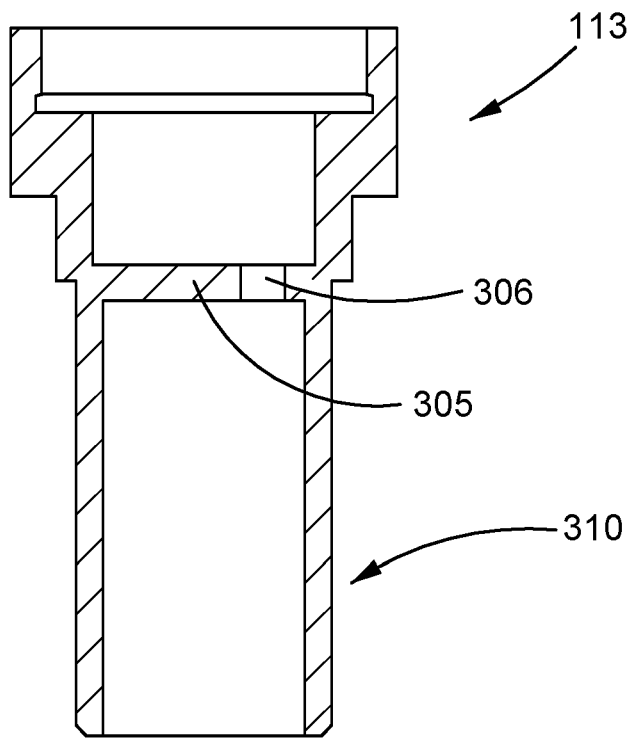
FIG. 3D is a sectional view of a first portion of the chemical vapour sampler housing device of FIG. 1.

FIGS. 3C and 3D show the fibre guard 113, depicting positional holes 306 formed in a guard surface 305 within the body of the fibre guard 113. The positional holes 306 allow SPME holders loaded into the device 100 to pass through into the sampling end 310 of the fibre guard 113. The fixed position of the positional holes 306 may further align and retain the loaded SPME holders in position. An interior guard surface 305 may be formed within the body of the fibre guard 113. The guard surface 305 may provide a biasing surface that loaded SPME holders are positioned against, allowing for the sampling ends of the SPME holders to extend through the positional holes 306 and preventing the remainder of the assembled SPME holders from being extended outside the body of the barrel 123.

Figure 4B:
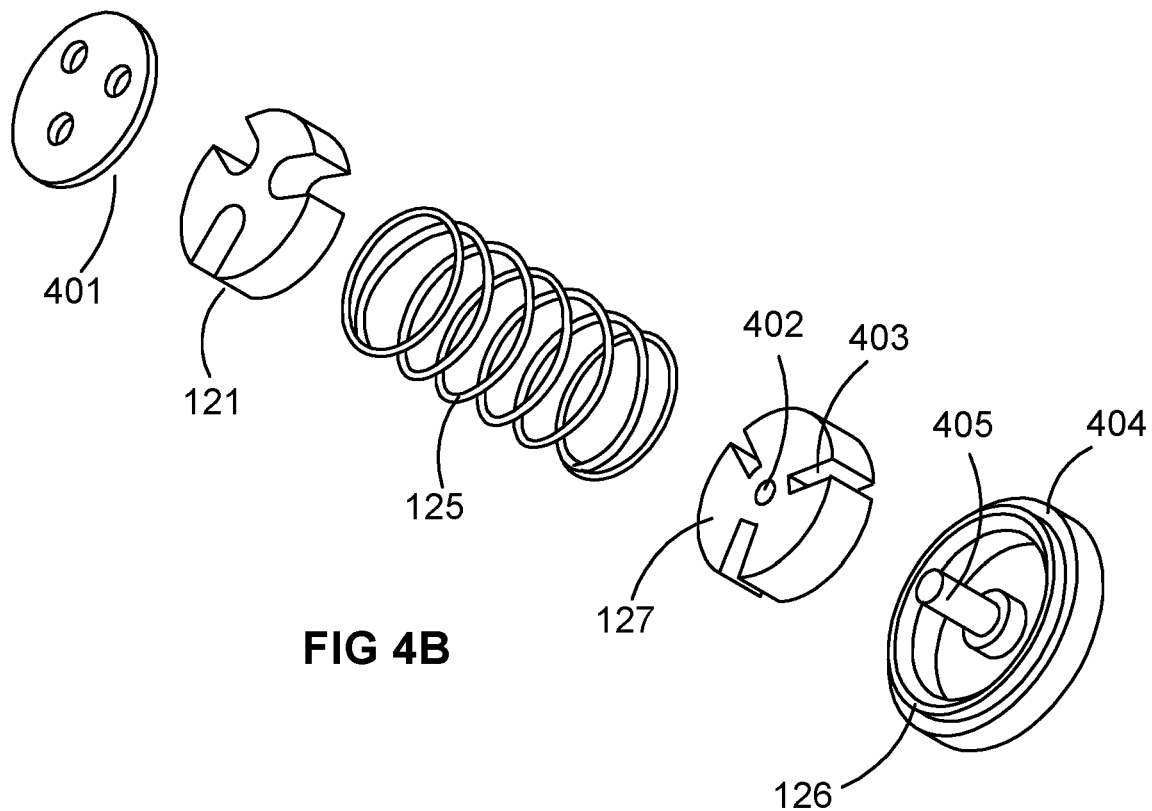
FIG. 4B is an exploded perspective view of an internal fixing mechanism of the chemical vapour sampler housing device of FIG. 1.

FIGS. 4A and 4B show components of barrel assembly 120. Barrel assembly 120 comprises a barrel 123, as shown in FIG. 4A. barrel 123 is sized to house the assembled components depicted in FIG. 4B, in addition to at least one sampler fibre held in a fibre holder. According to some embodiments, these may be SPME fibres 304 housed in SPME holder 601, as described in further detail below with reference to FIG. 6.

FIG. 4B depicts an embodiment of the internal components of the barrel assembly 120. The internal components comprise a seal 401, carrier spacer 121, spring 125, fixing spacer 127, and retaining nut 126. Seal 401, carrier spacer 121 and fixing spacer 127 may be configured to hold the sampler fibres within housing device 100.

Seal 401 may be provided to ensure alignment of the SPME holders in the internal assembly. In some embodiments, the seal 401 may be of soft washer seal in some embodiments. In some embodiments, the seals may be of rubber of between 1 mm to 5 mm in thickness having a number of apertures arranged to hold ends of fibre sampler fibres. The number of apertures may be consistent with the number of fibres to be housed within housing device 100.

Figure 6:
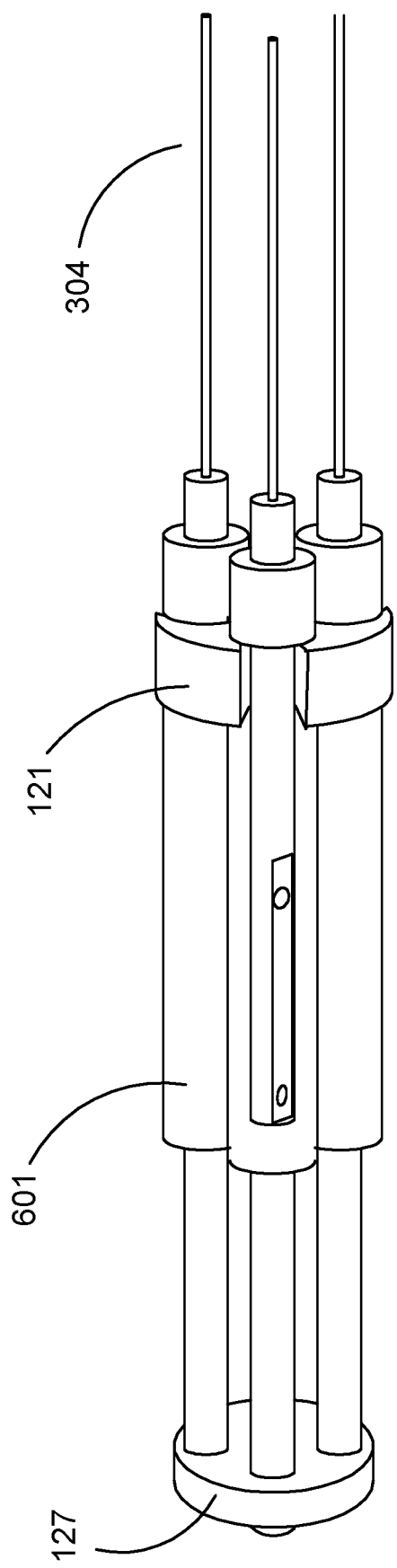
FIG. 6 is a perspective view of an assembled internal SPME holder assembly of the device of FIG. 1.

Carrier spacer 121 may be provided to act as a biasing surface against which fibre holders, such as fibre holders 601 of FIG. 6, are pressed against seal 401 and fibre guard 113 in order to actuate loaded fibre holders to extend or retract the fibres contained therein. In some embodiments the carrier spacer 121 may be constructed of a lightweight plastic in order to reduce overall weight and to improve one-handed usability. In other embodiments, metals such as stainless steel, or aluminium or other suitable materials may be used for carrier spacer 121.

Spring 125 may be formed of a metal or plastic material, and may be configured to provide resistive force against fixing spacer 127 and rim 415 of barrel 123, as described below.

Fixing spacer 127 may be configured to hold one end of each fibre holder within housing device 100. Fixing spacer 127 comprises a screw engagement hole 402, configured to mate with a screw 405 of retaining nut 126. Fixing spacer 127 further comprises guide slots 403 to hold the ends of the fibre holders, while easily allowing their replacement, removal, or installation within the internal assembly of housing device 100. In some embodiments, three slots 403 are provided of equal distance around the circumference of the spacer 127, in order to hold three fibre holders. In other embodiments, other numbers of slots may be provided to accommodate greater or lesser numbers of fibre holders. In some embodiments, the fixing spacer 127 may be constructed of a lightweight plastic in order to reduce overall weight and to improve one-handed usability of the device. In other embodiments, metals such as stainless steel, or aluminium or other suitable materials may be used for fixing spacer 127.

Retaining nut 126 may be configured to provide a base against which spring 125 can act to cause extension of the internal assembly of housing device 100 and the sampler fibres housed within housing device 100 when acted upon by the extension plunger 134, as described in further detail below with reference to FIGS. 5A and 5B. Retaining nut 126 comprises a screw 405 which, when assembled, screws into the matching screw engagement hole 402 of fixing spacer 127, and a flange 404 for spring 125 to act upon. In some embodiments, the retaining nut 126 may be constructed of a lightweight plastic in order to reduce overall weight and to improve one-handed usability of the device. In other embodiments, metals such as stainless steel, or aluminium or other suitable materials may be used for retaining nut 126.

Barrel 123 may have a series of differing internal diameters in order to accommodate the different components of the internal assembly described above, as best shown in FIG. 1. In some embodiments, these comprise a first internal diameter 410 wide enough to accommodate spring 125, which may be biased against the rim 415 of the second internal diameter 420 and the retaining nut 126. Second diameter 420 may be wide enough to accommodate the desired number of sample fibres and sample fibre holders. A third internal diameter 430 may be provided at the sampling end of the barrel, of a suitable width to accommodate the carrier spacer 121 which may be loaded into sampling end assembly 110.

When fibre holders such as SPME holders 601 holding sampler fibres such as SPME fibres 304 are placed within the guide slots 403 of spacer 127, the movement of the extension plunger 134 acting upon the combined retaining nut 126 and fixing spacer 127 is sufficient to actuate the fibre holder and extend the sampler fibres contained therein into the environment, in order to conduct a sampling operation. Similarly, the sampler fibres may be retracted through a reverse operation of the extension mechanism when samples have been taken. The retaining nut 126 may further engage with spring 125, the spring 125 compressing against flange 404 of the retaining nut 126 and the flange 415 of the second interior diameter 420 of the barrel 123.

Figure 5A:
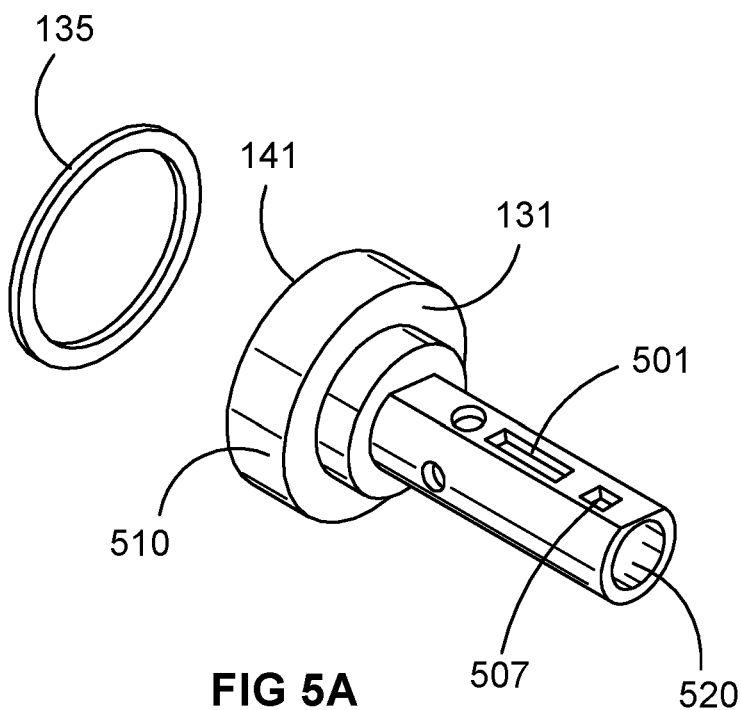
FIG. 5A is a perspective view of a retractable extension assembly portion of the chemical vapour sampler housing device of FIG. 1.
Figure 5B:
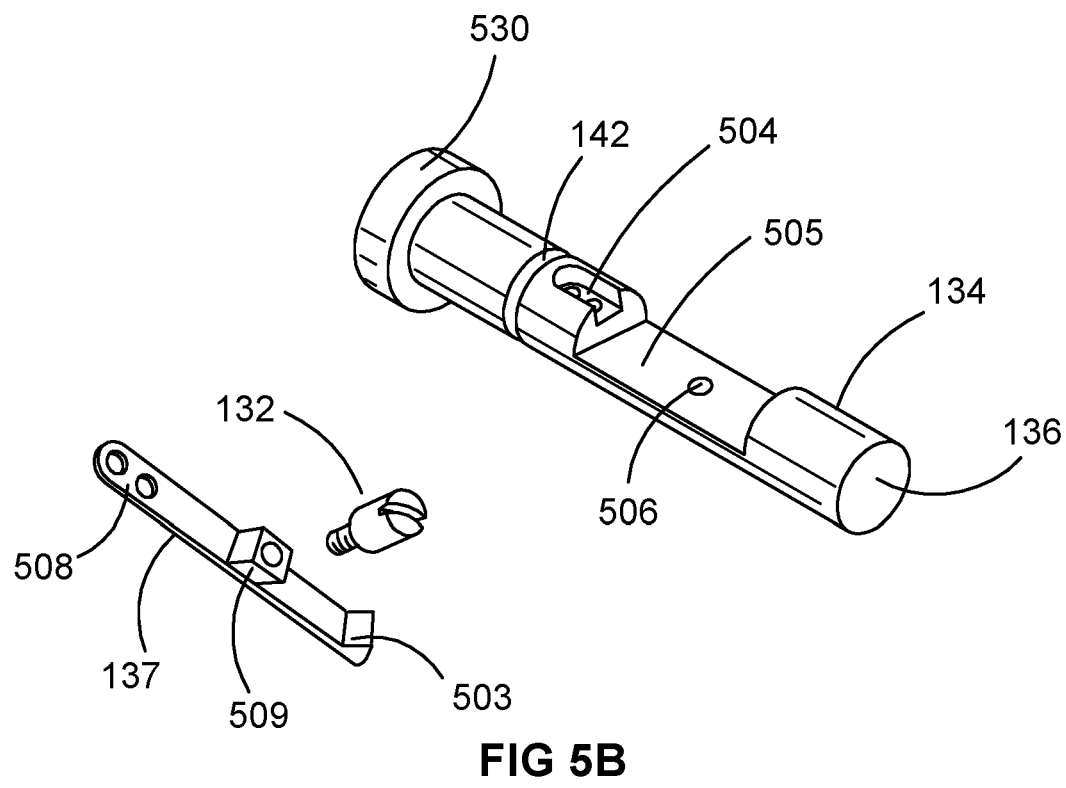
FIG. 5B is an exploded perspective view of an internal extension mechanism of the chemical vapour sampler housing device of FIG. 1.

FIGS. 5A and 5B depict the retractable extension assembly 130 in further detail. The retractable extension assembly 130 comprises seals 135 and 142, assembly housing 131, extension plunger 134, locking spring 137, locking spring retaining screws 138 and lock release 132.

Seal 135 may be provided to seal the connection between barrel assembly 120 and retractable extension assembly 130, as described above. Assembly housing 131 comprises a tube having a first end 510 and second end 520, and comprising multiple stages of diameter in order to house extension plunger 134 at the second end 520, while having the first end 510 be of a larger end diameter to engage with the barrel 123. In some embodiments the engagement between the extension assembly 130 and the barrel 123 comprises a thread engagement, comprising a thread portion 128 on barrel 123 and a thread portion 141 on first end 510 of assembly housing 131. In other embodiments, other engagements may be provided on the barrel 123 or the housing 131 such as locking flanges, or other suitable removable means that allow for the interior of the device to remain environmentally sealed. Seal 135 may be positioned within the thread portions of extension assembly 130 and barrel assembly 120 to ensure the connection is watertight, and to prevent contaminants or sterilisation fluid entering the barrel assembly 120.

The assembly housing 131 may further comprise a lock release button slot 501, and position slot 507, formed as apertures within assembly housing 131. The functions of lock release button slot 501 and position slot 507 are described in further detail below. In some embodiments the lock release 132 comprises a button having an elongate head and a threaded end portion, allowing the button to be screwed into the locking spring 137. In other embodiments, the lock release 132 may be substantially formed as part of the lock spring 137.

Extension plunger 134 comprises an elongate cylindrical rod having a flared first end 530 of a wider diameter, the wider diameter being of a substantially similar size to the internal components of the barrel assembly 120 shown in FIG. 4B, in order to evenly distribute the actuation force when the plunger 134 is depressed. The second end 136 of plunger 134 is configured to sit outside of assembly housing 131 when device 100 is assembled, allowing a user to actuate plunger 134 by applying force to second end 136.

Plunger 134 may also include a channel 505, locking pin aperture 506, and spring fixing points 504. The channel 505 provides a substantially empty region between the locking spring 137 and the plunger 134, and provides clearance for the locking spring 137 to deflect downwards, as described in further detail below.

Locking spring 137 comprises an elongate body having a positional lock flange 503, a lock release point 509, and fixing apertures 508. Locking spring 137 may be affixed at spring fixing points 504 with locking spring retaining screws 138 within the plunger 134. Locking spring 137 may be constructed of a lightweight and flexible metal, such as aluminium or stainless steel. In other embodiments, plastic or other suitable materials may be used.

When a user presses the plunger end 136 of an assembled housing device 100, the plunger 134 slides toward the barrel assembly 120 of device 100 within assembly housing 131, and moves the retaining nut 126 toward sampling end assembly 110, which in turn causes extension of any fibres housed by housing device 100 and connected to the fixing spacer 127, which may be the SPME fibres 304 within SPME holders 601, to be extended out of the sampling end assembly 110. When plunger 134 is in a pressed position as described, the lock flange 503 of locking spring 137 extends into the position slot 507 of assembly housing 131, thereby preventing the return of the plunger 134 from the pressed position despite the resisting force of the spring 125.

In order to retract extended SPME fibres 304, the lock release 132 is depressed, lock release 132 is fixed to locking spring 137 at lock release point 504, causing the locking spring 137 to bend and causing lock flange 503 to drop through aperture 507 to slide into the position slot 501. This allows the force of the compressed spring 125 to push the plunger 134 back to its original position. The mechanism of the extension assembly 131 allows a user to extend or retract the SPME fibres 304 from the device with one hand, thereby enhancing ease of use. To extend fibres 304, a user can hold device 100 and depress end 136 of plunger 134. To retract fibres 304, a user can hold device 100 and depress lock release 132.

In some embodiments, the extension assembly 130 may comprise a substantially similar housing to that described above, with a ratcheting extension mechanism that alternately extends or retracts plunger 134. In some embodiments this mechanism may operate with a single click extending and retracting the plunger 134. In other embodiments a multiple ratcheting extensions mechanism is provided.

In such multiple ratcheting embodiments, the extension assembly 130 may further comprise a sliding toothed gear, interfacing with a ring of teeth formed on the inside of the barrel. When the plunger end is depressed the gear may move down to a locked position on the interior teeth, thereby holding the extended fibres 304 in an open position. The fibres 304 may be retracted by the same action, which then moves the gear to an unlocked position thereby allowing retraction of the extension assembly 130.

In some embodiments, the extension mechanism 130 may comprise a gear system having an actuator in the form of a toothed gear wheel. The gear wheel may be configured to project from a side of the barrel allowing actuation by rolling of the thumb. The gear wheel may further be configured to engage a toothed internal bar that can be wound up and down the shaft.

FIG. 6 depicts an embodiment of the internal barrel assembly components wherein three SPME holders 601 are loaded between carrier spacer 121 and fixing spacer 127. In other embodiments, fewer SPME holders may be used, such as two or one SPME holder. In other embodiments, a greater number of SPME holders may be used, such as four, five, six, seven, or more SPME holders.

To use housing device 100 in a sampling operation, a user may first remove end cap 111. Then, with the use of one hand around the housing device 100 and with the open, uncapped fibre guard 113 facing towards a desired chemical vapour source to be sampled, the user can use their thumb or a finger to depress end 136 of the extension plunger 134 until it is locked in position by locking spring 137.

At the open end of the fibre guard 113, internally supported fibres 304 may then be exposed in close proximity to the target/substance to be sampled. Due to fragility of sampling fibres 304, contact with the target/substance is not advised. Volatile chemicals are then adsorbed onto the fibres.

Once collection time is reached, the extension plunger 134 is released with the use of the thumb or a finger on the lock release 132. The extension plunger 134 then retracts the exposed fibres 304 into the body of the housing device 100. Once the exposed fibres 304 are retracted, the end cap 111 may be screwed back on to the fibre guard 113, forming a watertight seal so as to be able to wet decontaminate/clean the external surfaces.

Once cleaned and decontaminated, device 100 may be disassembled to remove the three internally supported SPME holders 601.

Disassembly of the housing device 100 may comprise the steps of unscrewing the extension assembly 130 from the barrel assembly 120, retaining nut 126 and removing spring 125. The barrel 123 may then be unscrewed from the needle guard 113 exposing the internal barrel assembly containing the SPME holders 601, fixing spacer 127 and carrier spacer 121. The SPME holders 601 may then be removed with the carrier spacer 121 and fixing spacer 127. Each individual SPME holder 601 may then be separated for either storage or use. Assembly of the housing device 100 may be undertaken by reversing the disassembly process described above.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A device for housing chemical vapour sampling material, the device comprising:
    a housing comprising a barrel, the barrel being configured to hold at least two fibre holders, each fibre holder configured to hold a fibre of chemical vapour sampling material, the barrel having a first opening at a first end configured to deploy at least a portion of each fibre of chemical vapour sampling material stored within the at least two fibre holders;
    an extension mechanism arranged to cause extension of each fibre of chemical vapour sampling material stored within the at least two fibre holders from the housing via the first opening, the extension mechanism being operable by actuation of at least one actuator, wherein actuating the at least one actuator causes extension of each fibre of the chemical vapour sampling material stored within the at least two fibre holders from the housing via the first opening; and
    a retraction mechanism configured to provide a retracting force upon compression by the extension mechanism to cause retraction of each fibre stored within the at least two fibre holders.

2. The device according to claim 1, wherein the extension mechanism is a retractable extension mechanism engaged with a second end of the barrel, and the at least one actuator comprises a button.

3. The device of claim 1, wherein the barrel is configured to hold at least three fibre holders.

4. The device of claim 1, wherein the extension mechanism is arranged to cause extension or retraction of each fibre of chemical vapour sampling material simultaneously.

5. The device of claim 1, wherein the at least one actuator comprises a first button and second button, the actuation of the first button causing extension of each fibre of chemical vapour sampling material from the housing via the first opening, and the second button causing retraction of each fibre of chemical vapour sampling material from the housing via the first opening.

6. The device of claim 1, wherein the at least one actuator comprises a single button, wherein the actuation of the single button causes alternate extension and retraction of each fibre of the chemical vapour sampling material from the housing via the first opening.

7. The device of claim 1, where in the device further comprises a fibre guard, having a first and second end, the second end of the fibre guard fixable to the first end of the barrel and arranged to house the sampling ends of loaded fibres of chemical vapour sampling material.

8. The device of claim 7, wherein the device further comprises an end cap fixable to the first end of the fibre guard, and at least one sealing ring between the fibre guard and the end cap.

9. The device of claim 1, wherein the device further comprises a extension assembly housing, fixable to the second end of the barrel, and arranged to house the extension mechanism.

10. The device of claim 9, wherein the device further comprises at least one sealing ring between the barrel and the extension assembly housing.

11. The device of claim 1, wherein the device further comprises at least one internal fixing ring for each fibre of chemical vapour sampling material, arranged to align each fibre within the interior of the housing.

12. The device of claim 11, wherein the device further comprises a spring housed within the barrel and connected to the at least one internal fixing ring at a first end, and the interior of the housing at a second end, arranged to provide a retracting force upon compression by the extension mechanism.

13. The device of claim 11, wherein the extension mechanism comprises a plunger, having a first end and second end, wherein the first end is disposed against the at least one internal fixing ring, and the second end may be accessible by a user.

14. The device of claim 13, wherein the extension mechanism further comprises at least one aperture, providing user access to the second end of the plunger, allowing use of the plunger as a button to extend the extension mechanism.

15. The device of claim 14, wherein the extension mechanism further comprises a locking spring fixable to the plunger and accessible by a user, tensioned against the at least one aperture, allowing displacement of the plunger when the second end of the plunger is pressed, and return of the plunger when the locking spring is depressed.

16. A method of taking chemical vapour sample comprising the steps of:
- loading at least two fibre holders into a housing, the housing comprising a barrel having a first and second end, and each fibre holder being configured to hold a fibre of chemical vapour sampling material;
- causing an extension of the at least one chemical vapour sampling material from a first end of the housing by actuation of an extension mechanism, the extension mechanism attached to a second end of the housing;
- retracting each fibre of chemical vapour sampling material back into the housing, by actuation of a retraction mechanism, the retraction mechanism configured to provide a retracting force upon compression by the extension mechanism to cause retraction of each fibre; and
- environmentally sealing the housing.

17. The method of claim 16, wherein the housing is configured to hold at least three fibre holders.

18. The method of claim 16, wherein the actuation of the extension mechanism is operable by a single hand.

19. The method of claim 16, wherein the housing is environmentally sealed by affixing an end cap to a first end of the barrel.

20. The method of claim 16, wherein the method further comprises the step of sterilising the exterior of the housing.

* * * * *